(12) United States Patent
Lee et al.

(10) Patent No.: US 8,741,159 B2
(45) Date of Patent: Jun. 3, 2014

(54) TOUCH SCREEN PANEL AND FABRICATING METHOD FOR THE SAME

(75) Inventors: Kyu-taek Lee, Yongin (KR); Kwan-Young Han, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 321 days.

(21) Appl. No.: 13/108,632

(22) Filed: May 16, 2011

(65) Prior Publication Data

US 2012/0120003 A1 May 17, 2012

(30) Foreign Application Priority Data

Nov. 17, 2010 (KR) ........................ 10-2010-0114336

(51) Int. Cl.
*G06F 3/041* (2006.01)
*B32B 38/10* (2006.01)

(52) U.S. Cl.
USPC ................... 216/13; 216/33; 216/36; 216/83; 216/92; 216/97

(58) Field of Classification Search
None
See application file for complete search history.

(56) References Cited

U.S. PATENT DOCUMENTS

| 2006/0270130 | A1* | 11/2006 | Sato et al. ...................... 438/166 |
| 2010/0119846 | A1* | 5/2010 | Sawada ......................... 428/426 |
| 2011/0242018 | A1* | 10/2011 | Kang et al. .................... 345/173 |
| 2011/0316808 | A1* | 12/2011 | Hsieh ............................ 345/174 |
| 2012/0251800 | A1* | 10/2012 | Nakayama et al. ........... 428/210 |
| 2013/0038553 | A1* | 2/2013 | Huang et al. .................. 345/173 |
| 2013/0082968 | A1* | 4/2013 | Huang et al. .................. 345/173 |
| 2013/0153388 | A1* | 6/2013 | Chan et al. .................... 200/5 R |

FOREIGN PATENT DOCUMENTS

| KR | 10-2011-0120047 | 11/2011 | |
| WO | WO 2012/070819 A2 * | 5/2012 | ............. G06F 3/041 |

* cited by examiner

*Primary Examiner* — Anita Alanko

(74) *Attorney, Agent, or Firm* — Christie, Parker & Hale, LLP

(57) ABSTRACT

A method of fabricating a touch screen panel according to an embodiment of the present invention includes: forming a reinforcing layer on the top and the bottom of a glass substrate by reinforcing the entire surface of the glass substrate defining a plurality of unit cell regions; forming the touch screen panels in the unit cell regions on a side of the glass substrate with the reinforcing layers; cutting the reinforced glass substrate into the touch screen panels; forming passivation layers on the outer surfaces of the touch screen panels and sequentially stacking the touch screen panels; and simultaneously with the stacking, performing healing on the non-reinforced cut-sides of the stacked touch screen panels.

8 Claims, 4 Drawing Sheets

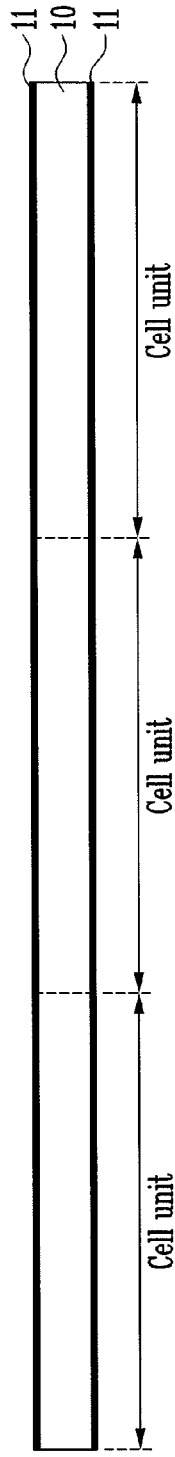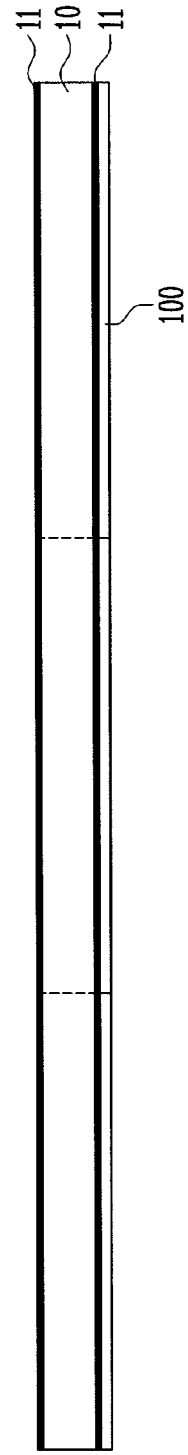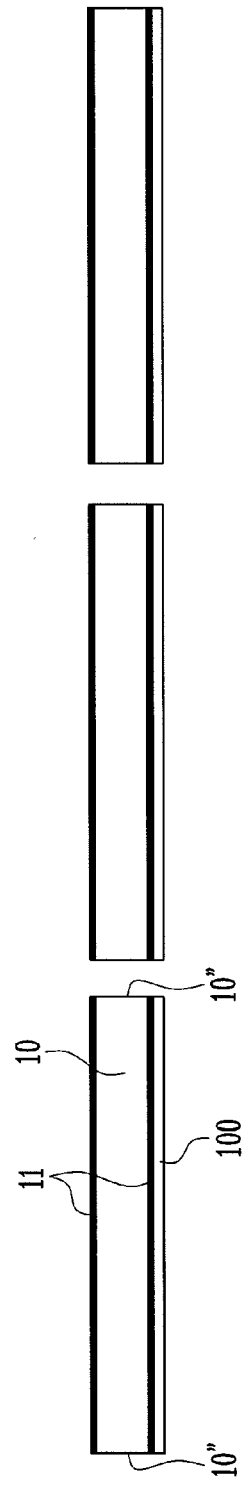

TOUCH SCREEN PANEL AND FABRICATING METHOD FOR THE SAME

CROSS-REFERENCE TO RELATED APPLICATION

This application claims priority to and the benefit of Korean Patent Application No. 10-2010-0114336, filed on Nov. 17, 2010, in the Korean Intellectual Property Office, the entire content of which is incorporated herein by reference.

BACKGROUND OF THE INVENTION

1. Field of the Invention

The disclosure relates to a touch screen panel that is provided in an image display device etc, and a fabricating method for the same.

2. Description of Related Art

Touch screen panels are input devices that allow selection of contents displayed on the screen of an image display device, etc., in response to input commands by a person's hand or an object.

To this end, the touch screen panel is provided on a front face of the image display device and converts the position where a person's hand or an object directly contacts the panel into electrical signals. Accordingly, the instruction selected at the contact point is received as an input signal.

As touch screen panels can replace separate input devices that operate through connection to the image display device, such as a keyboard and a mouse, the use field of touch screen panels is gradually expanding.

However, recently, thin touch screen panels are desirable because when a touch screen panel is attached on the panel of an image display device, the entire volume increases, and portability may be reduced.

However, it is common to include an additional window disposed on the touch screen panel to increase mechanical strength, which increases the thickness of the touch screen panel and runs counter to the desirability of decreased thickness in the touch screen panel.

Further, although it is common to include the window using a reinforced glass substrate, in order to use a reinforced glass substrate for the window, an organic substrate is cut into cells and individually reinforced. However, using unit cell windows makes it difficult to ensure productivity when fabricating a touch screen panel.

On the contrary, fabricating a touch screen panel in a mother substrate, using a non-reinforced glass substrate, decreases the yield strength of the window such that it cannot function as the window.

SUMMARY OF THE INVENTION

According to embodiments of the present invention, a touch screen panel has improved yield strength and productivity by reinforcing a glass substrate used as a window in a mother substrate, and healing the non-reinforced side generated by cutting each cell region after forming a touch screen panel for each cell region (i.e., healing the cut cross-sections), thereby implementing a window-integrated touch screen panel with sensing electrodes on the window. Other embodiments are directed to a fabricating method for the touch screen panel.

A method of fabricating a touch screen panel according to an embodiment of the present invention includes: forming a reinforcing layer on the top and the bottom of a glass substrate by reinforcing the entire surface of the glass substrate where a plurality of touch screen panels is formed into unit cells; forming the touch screen panels for the unit cell regions on a side of the glass substrate with the reinforcing layer; cutting the reinforced glass substrate into unit cells where the touch screen panels are formed; forming passivation layers on the outer surfaces of the glass substrate cut into unit cells and the touch screen panels and sequentially stacking the touch screen panels; and performing healing simultaneously on the stacked glass substrates of the unit cells, on the non-reinforced cut-sides of the glass substrate exposed by the cutting.

Further, the passivation layers are formed as a detachable film or paste.

Further, the healing is a process in which a chemical solution contacts the cut-side and the chemical solution is an HF-based solution containing an inorganic acid and an ammonium-based additive.

Further, the healing is a process in which at least one or more solution discharging units discharge the chemical solution to the cut-side of the stacked glass substrate of the unit cells, and the solution discharging unit brings the chemical solution into contact with the cut-side of the stacked glass substrate of the unit cells by rotating and reciprocating.

In this configuration, the solution discharging unit is provided with a roll brush on the outer circumference such that the roll brush directly contacts the cut-side to effect the healing, or the solution discharging unit is provided with a spray nozzle at a side on the outer circumference to perform the healing by spraying the chemical solution on the cut-side.

Further, a touch screen panel according to an embodiment of the present invention includes: a glass substrate having reinforcing layers on a first surface and a second surface; sensing patterns formed in an active area on the first surface of the glass substrate; and sensing lines formed in a non-active area around the active area and connected to the sensing patterns, in which the edge of a non-reinforced surface exposed at a side of the glass substrate is rounded.

In this configuration, the glass substrate with the reinforcing layers functions as a window, the second surface is the surface that is exposed to the outside, and the reinforcing layer is implemented when sodium (Na) on the surface of the glass substrate is substituted with potassium (K).

According to the present invention described above, it is possible to minimize the entire thickness of the touch screen panel by forming sensing electrodes on a window.

Further, it is possible to remove fine cracks on a cut cross-section and ensure yield strength and productivity of a touch screen panel by reinforcing a glass substrate that is used as a window in a mother substrate and healing a non-reinforced surface generated by cutting unit cells after forming the touch screen panel from each unit cell region (i.e., healing the cut cross-section).

BRIEF DESCRIPTION OF THE DRAWINGS

The accompanying drawings, together with the specification, illustrate exemplary embodiments of the present invention, and, together with the description, serve to explain the principles of the present invention.

FIGS. 4A to 4F are cross-sectional views sequentially illustrating a method of fabricating a touch screen panel according to an embodiment of the present invention.

DETAILED DESCRIPTION OF THE EMBODIMENTS

Figure 1:
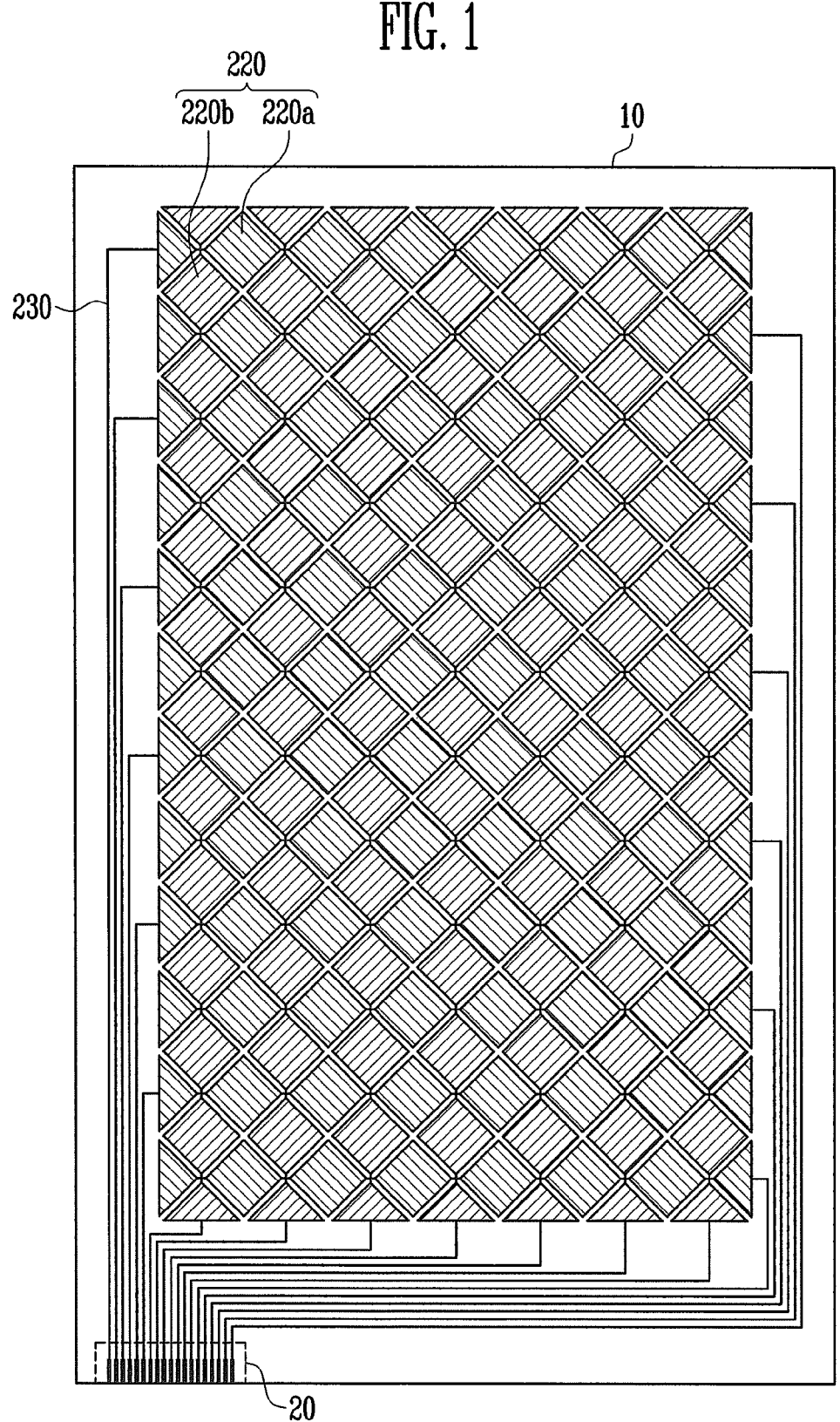
FIG. 1 is a plan view schematically showing a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements positioned therebetween. Also, when an element is referred to as being "connected to" another element, it can be directly connected to the other element or be indirectly connected to the other element with one or more intervening elements positioned therebetween. Hereinafter, like reference numerals refer to like elements.

Hereinafter, embodiments of the present invention will be described in detail with reference to the accompanying drawings.

FIG. 1 is a plan view schematically showing a touch screen panel according to an embodiment of the present invention. Further, FIG. 2 is an enlarged view showing the main parts of an example of the sensing pattern shown in FIG. 1.

However, this is for a touch screen panel with sensing patterns on a glass substrate, and the figures show a touch screen panel formed by reinforcing the glass substrate for a mother substrate, forming a plurality of touch screen panels on the transparent substrate, and cutting them into cells.

Figure 2:
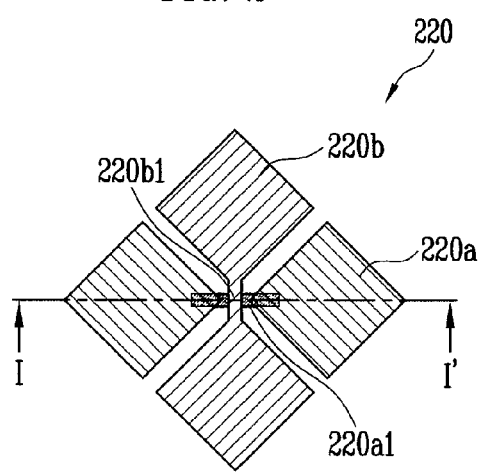
FIG. 2 is an enlarged view showing the main parts of an example of the sensing pattern shown in FIG. 1.

Referring to FIGS. 1 and 2, a touch screen panel according to an embodiment of the present invention includes a transparent substrate 10, a sensing pattern 220 on the transparent substrate 10, and sensing lines 230 connecting the sensing pattern 220 with an external driving circuit through a pad unit 20.

The sensing pattern 220, as shown in FIG. 2, includes a plurality of first sensing cells 220a formed in connection with each other in the row direction in each row, first connecting lines 220a1 connecting the first sensing cells 220a in the row direction, second sensing cells 220b formed in connection with each other in the column direction in each column, and second connecting lines 220b1 connecting the second sensing cells 220b in the column direction.

Although only some of the sensing patterns are shown in FIG. 2 for convenience, the touch screen panel has a structure in which the sensing patterns shown in FIG. 2 are repeated.

The first sensing cells 220a and the second sensing cells 220b are alternately arranged so as not to overlap each other, while the first connecting lines 220a1 and the second connecting lines 220b1 intersect each other. Insulating layers (not shown) are disposed between the first connecting lines 220a1 and the second connecting lines 220b1 to ensure stability.

Meanwhile, the first sensing cells 220a and the second sensing cells 220b may be made of transparent materials, such as indium-tin-oxide (hereafter, ITO), may be formed integrally with the first sensing lines 220a1 and the second sensing lines 220b1, respectively, or may be separately formed in electric connection with each other.

For example, the second sensing cells 220b and the second connecting lines 220b1 are integrally formed in the column direction, and the first sensing cells 220a are patterned to have independent patterns between the second sensing cells 220b and may be connected in the row direction by the upper or lower first connecting lines 220a1.

In this configuration, the first connecting lines 220a1 may be electrically connected in direct contact with the first sensing cells 220a, above or under the first sensing cells 220a, or may be electrically connected with the first sensing cells 220a through contact holes.

The first connecting lines 220a1 may be made of a transparent electrode material, such as ITO, or an opaque low-resistance material, and the width etc. can be adjusted to prevent visualization of the pattern.

The sensing lines are electrically connected with the first and second sensing cells 220a and 220b in each row and each column and connect the sensing cells with an external driving circuit (not shown), such as a position detecting circuit, through the pad unit 20.

The sensing lines are disposed around an active area where an image is displayed, and may be made of a low-resistance material, such as Mo, Ag, Ti, Cu, Al, and Mo/Al/Mo, instead of the transparent electrode material used for forming the sensing pattern 220.

The touch panel according to an embodiment of the present invention described above is a capacitive type touch panel, in which a contact object, such as a human hand or a stylus pen contacts the touch screen panel to cause a change in electrostatic capacitance corresponding to the contact position which is transmitted to the driving circuit (not shown) from the sensing pattern 220 through the sensing lines 230 and the pad unit 20. Accordingly, the change in electrostatic capacitance is converted into an electric signal by an X- and Y-input process circuit (not shown), such that the contact is located.

The touch screen panel is generally formed on an individual substrate and attached on an image display device etc. However, this causes the entire thickness of the display device to increase.

Accordingly, an embodiment of the present invention is characterized in that the upper side of the transparent substrate 10 is a surface that a contact object directly contacts, that is, the transparent substrate 10 functions as the window of the display device.

That is, the window is integrated with the transparent substrate of the touch screen panel, without providing an additional window. Therefore, it is possible to improve manufacturing efficiency by simplifying the manufacturing process and reducing the material cost, in addition to implementing a thin touch screen panel.

However, for this configuration, it is preferable that the transparent substrate 10 is formed of a reinforced glass substrate that will function as a window, such that an embodiment of the present invention has a large advantage in ensuring productivity by not applying reinforcement to the unit cells, but applying reinforcement to the mother substrate before cutting it into unit cells.

Figure 3:
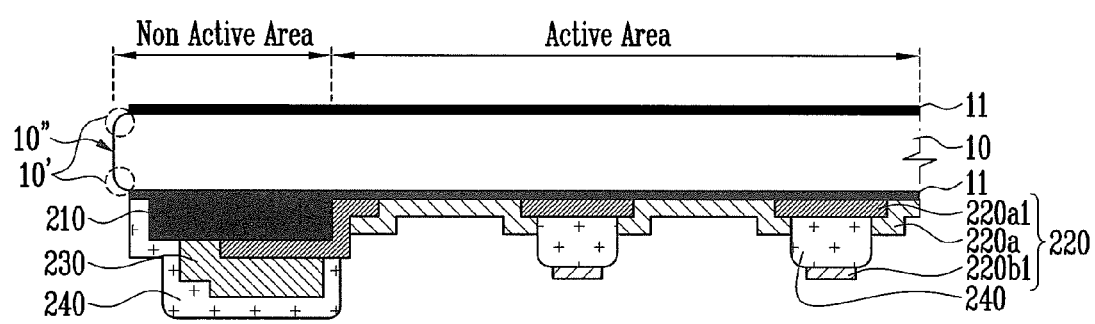
FIG. 3 is a cross-sectional view of a portion (I-I') of a touch screen panel according to an embodiment of the present invention.

FIG. 3 is a cross-sectional view of a portion (I-I') of a touch screen panel according to an embodiment of the present invention.

That is, FIG. 3 is a cross-sectional view showing one side of a touch screen panel on a reinforced glass substrate which has been cut into unit cells.

In this configuration, for example, the reinforced glass substrate may be formed by immersing the glass substrate into a $KNO_3$ solution and heating it at 400 degrees to 450 degrees for 15 to 18 hours, such that sodium (Na) on the surface of the glass substrate is substituted with potassium (K) by the process, thereby improving the surface strength of the glass substrate.

That is, as shown in FIG. 3, a reinforcing layer 11 formed on the surface of the reinforced glass substrate 10 has improved strength by substituting sodium (Na) on the surface with potassium (K).

Further, the sensing patterns 220 in the active region of the reinforced glass substrate 10 include the first sensing cells 220 connected in a first direction in each row, the first connecting lines 220a1 connecting the first sensing cells 220a in the row direction, the second sensing cells 220b connected in the column direction in each column, and the second connecting lines 220b1 connecting the second sensing cells 220b in the column direction, and insulating layers 240 disposed at the intersections of the first connecting lines 220a1 and the second connecting lines 220b1.

Further, black matrices 210 and sensing lines 230 overlapping the black matrices and electrically connected with the sensing patterns 220 are in the non-active area around the active area, as shown in the figure.

The black matrices 210 prevent the patterns, such as the sensing lines, from being visualized and form the edge of the display region.

However, the sensing patterns 220, the insulating layers 240, the black matrices 210, and the sensing lines 230, which are shown in FIG. 3, are enlarged in thickness and area for convenience of description, and actually, they are thinner than the glass substrate 10.

However, when the reinforced mother substrate is cut into unit cells, the cut cross-section, that is, the non-reinforced side of the exposed glass substrate remains after cutting. However, in an embodiment of the present invention, it is possible to ensure productivity and improve yield strength of the touch screen panel by removing fine cracks on the cut-side by healing the exposed cut-side.

That is, as shown in FIG. 2, the cut-side of the glass substrate 10 according to an embodiment of the present invention is characterized in that the edge 10' is smoothed by the healing.

A process of fabricating a touch screen panel according to an embodiment of the present invention is described in more detail with reference to FIGS. 4A to 4F.

FIGS. 4A to 4F are cross-sectional views sequentially illustrating a method of fabricating a touch screen panel according to an embodiment of the present invention.

First, referring to FIG. 4A, reinforcement is applied to a mother substrate 10, that is, to the entire surface of the glass substrate where a plurality of touch screen panels is formed in unit cells.

The reinforcing is performed by immersing the glass substrate 10 into a $KNO_3$ solution and heating it at 400 degrees to 450 degrees for 15 to 18 hours, such that sodium (Na) on the surface of the glass substrate is substituted with potassium (K) by the process, thereby improving the surface strength of the glass substrate. That is, a reinforcing layer 11 is formed on the surface of the glass substrate after the reinforcing process. However, this is just an example, and the reinforcing of the glass substrate is not limited thereto.

Next, as shown in FIG. 4B, a touch screen panel 100 is formed from each unit cell region of the mother substrate.

However, although this embodiment of the present invention depicts the mother substrate 10 as composed of three unit cells, this is for convenience of description and the present invention is not limited thereto.

Further, as described above with reference to FIGS. 1 to 3, the touch screen panel 100 includes the sensing patterns 220 in the active area, and the black matrices 210 and the sensing lines 230 in the non-active area, and the detailed description of these components is not provided for convenience of description in FIG. 4B.

Next, referring to FIG. 4C, the unit cell regions are cut after the touch screen panels 100 are completely formed in each unit cell region. The cutting is implemented physically or chemically by a wheel, a laser, water-jet, and etching, for example. Further, after the cutting has been finished, a step of polishing the cut-side may be further included.

However, a non-reinforced surface 10" is exposed on the cut-side after the cutting, and fine cracks may exist which may cause a reduction in the reliability of the resulting product.

Therefore, according to an embodiment of the present invention, reliability of the product is ensured by healing the non-reinforced surface, that is, the exposed cut-side 10".

Further, an embodiment of the present invention is characterized in that the healing is performed simultaneously with the stacking of the cells that were cut by the cutting, that is, the touch screen panels.

However, in the healing, the chemical solution used for the healing should not permeate the reinforcing surface 11 of the reinforced glass substrate and the touch screen panels 100. Accordingly, passivation layers 50 are formed on the outer surface of the cut glass substrate, that is, the upper surface of the reinforced surface 11 and the outer surfaces of the touch screen panels 100.

The passivation layers 50 are detachable and may be formed as a film or paste.

Figure 4D:
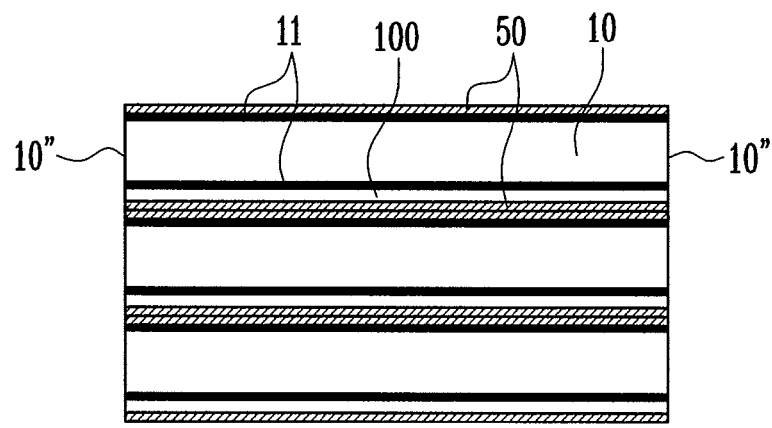

That is, referring to FIG. 4D, the touch screen panels with the passivation layers 50 are sequentially stacked and prepared for healing, with the non-reinforced cut-sides 10" exposed to the outside.

Figure 4E:
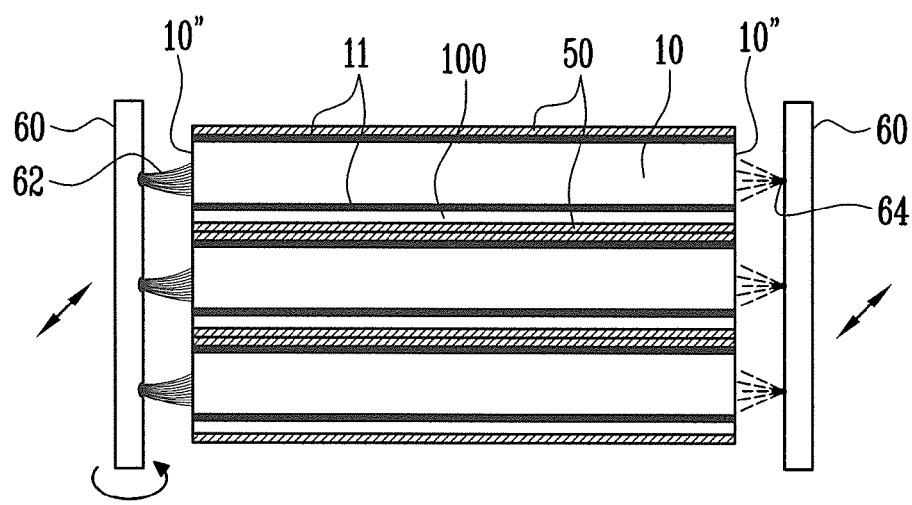

Next, referring to FIG. 4E, healing is performed on the cut-sides of the unit cells that are stacked.

The healing is a process in which a chemical solution contacts the cut-side 10". The chemical solution is an HF-based solution.

For example, the chemical solution may contain HF, an inorganic acid, and an ammonium-based additive.

Further, as shown in the figures, one or more solution discharging units 60 discharge the chemical solution to the exposed cut-sides 10" of the stacked touch screen panels 100, such that the healing is performed on the cut-sides 10".

The solution discharging units 60 uniformly distribute the chemical solution to the cut-sides 10" of the exposed edges (e.g. four sides) by rotating and reciprocating.

Further, the solution discharging units 60 may be provided with a roll brush 62 on the outer circumference such that the roll brush 62 directly contacts the cut-sides for healing, or the units 60 may be provided with a spray nozzle 64 at a side of the outer circumference to spray the chemical solution for healing.

The chemical solution containing HF contacts the exposed cut-sides 10" during the healing, such that the sharp inner portions of the fine cracks generated on the cut-sides 10" are depressed and smoothed, or the outer region of the cut cross-sections with the fine cracks can be removed.

Further, after the process for the cut-sides 10 is finished, the edges 10' of the cut-sides are rounded, as shown in the cross-sectional view of FIG. 3.

It is possible to control the degree of healing by controlling the concentration of HF in the chemical solution, the time that the cut-side is in contact with the chemical solution, the rotational speed of the roll brush, and the strength of the solution sprayed from the spray nozzle.

Figure 4F:
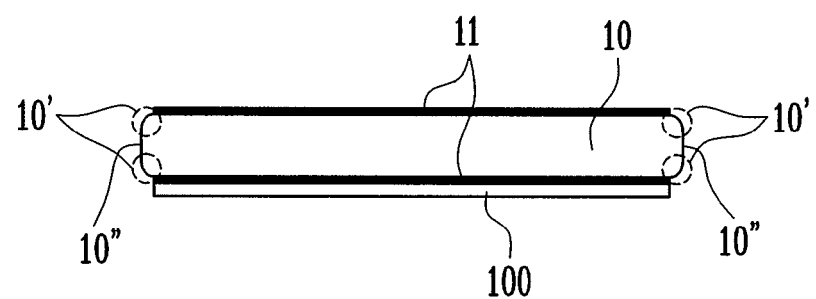

After the healing is finished, the passivation layers described with reference to FIG. 4D are removed and washing is performed, such that the touch screen panels 100 on the reinforced glass substrate 10 having cut-sides 10" with smooth edges 10' are completed, as shown in FIG. 4F.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of fabricating a touch screen panel, comprising:
    forming a reinforcing layer on a top and a bottom of a glass substrate by reinforcing an entire surface of the glass substrate, wherein the glass substrate defines a plurality of unit cell regions;
    forming a touch screen panel in each unit cell region on a side of the glass substrate with the reinforcing layer;
    cutting the reinforced glass substrate into the touch screen panels, wherein the cutting exposes a non-reinforced cut-side of each touch screen panel;
    forming passivation layers on outer surfaces of the touch screen panels and sequentially stacking the touch screen panels; and
    simultaneously with the stacking the touch screen panels, performing healing on the non-reinforced cut-side of the touch screen panels.

2. The method of fabricating a touch screen panel according to claim 1, wherein the passivation layers comprise a detachable film or paste.

3. The method of fabricating a touch screen panel according to claim 1, wherein the healing comprises contacting a chemical solution to the non-reinforced cut-sides of the touch screen panels.

4. The method of fabricating a touch screen panel according to claim 3, wherein the chemical solution comprises a HF-based solution comprising an inorganic acid and an ammonium-based additive.

5. The method of fabricating a touch screen panel according to claim 1, wherein the healing comprises discharging a chemical solution through one or more solution discharging units to the non-reinforced cut-sides of the touch screen panels.

6. The method of fabricating a touch screen panel according to claim 5, wherein the solution discharging unit contacts the chemical solution to the non-reinforced cut-sides of the touch screen panels by rotating and reciprocating.

7. The method of fabricating a touch screen panel according to claim 5, wherein the solution discharging unit comprises a roll brush on an outer circumference such that the roll brush directly contacts the non-reinforced cut-sides of the touch screen panels.

8. The method of fabricating a touch screen panel according to claim 5, wherein the solution discharging unit comprises a spray nozzle at a side on its outer circumference for spraying the chemical solution to the non-reinforced cut-sides of the touch screen panels.

* * * * *